(12) United States Patent
Shin et al.

(10) Patent No.: US 8,052,921 B2
(45) Date of Patent: Nov. 8, 2011

(54) APPARATUS FOR MANUFACTURING MOLTEN IRONS

(75) Inventors: Myoung-Kyun Shin, Pohang-shi (KR); Sang-Hyun Kim, Pohang-shi (KR); Jun-Hyuk Lee, Pohang-shi (KR); Kung-Won Nam, Pohang-shi (KR)

(73) Assignees: POSCO (KR); Siemens VAI Metals Technologies GmbH & Co., Linz (AT)

( * ) Notice: Subject to any disclaimer, the term of this patent is extended or adjusted under 35 U.S.C. 154(b) by 695 days.

(21) Appl. No.: 12/158,839

(22) PCT Filed: Dec. 26, 2006

(86) PCT No.: PCT/KR2006/005701
§ 371 (c)(1),
(2), (4) Date: Jun. 23, 2008

(87) PCT Pub. No.: WO2007/075024
PCT Pub. Date: Jul. 5, 2007

(65) Prior Publication Data
US 2008/0277842 A1  Nov. 13, 2008

(30) Foreign Application Priority Data
Dec. 26, 2005 (KR) .................... 10-2005-0130096

(51) Int. Cl.
*C22B 1/10* (2006.01)
(52) U.S. Cl. .......... 266/172; 266/144; 266/168; 75/453; 75/754; 95/271

(58) Field of Classification Search .......... 266/168–199; 75/453, 754; 95/271
See application file for complete search history.

(56) References Cited

U.S. PATENT DOCUMENTS

| | | | |
|---|---|---|---|
| 6,585,798 | B2 | 7/2003 | Choi et al. |
| 2006/0119023 | A1 | 6/2006 | Shin et al. |

FOREIGN PATENT DOCUMENTS

| | | | |
|---|---|---|---|
| CA | 2257492 | A | 11/1997 |
| JP | 11278890 | A | 10/1999 |
| JP | 2000511970 | A | 9/2000 |
| KR | 20030083862 | A | 1/2003 |
| KR | 20030083862 | * | 11/2003 |
| KR | 20040049381 | A | 6/2004 |
| KR | 20050089836 | A | 9/2005 |

* cited by examiner

*Primary Examiner* — Roy King
*Assistant Examiner* — Lois Zheng
(74) *Attorney, Agent, or Firm* — The Webb Law Firm

(57) ABSTRACT

An apparatus for manufacturing molten iron includes i) at least one fluidized-bed reduction reactor that reduces and plasticizes iron ore and converts the iron ore into reduced materials, ii) a melter-gasifier into which the reduced ore is charged and oxygen is injected, the melter-gasifier manufacturing molten iron, and iii) a reducing gas supply line that supplies a reducing gas discharged from the melter-gasifier to the fluidized-bed reduction reactor. The fluidized-bed reduction reactor includes a cyclone that is installed in the fluidized-bed reduction reactor to collect fine iron ore. A gas injector, which prevents the fine ore from adhering by injecting gas containing carbon, is connected to the cyclone.

14 Claims, 5 Drawing Sheets

APPARATUS FOR MANUFACTURING MOLTEN IRONS

BACKGROUND OF THE INVENTION

1. Technical Field

The present invention relates an apparatus for manufacturing molten irons that prevent fine iron ore from adhering to itself within a cyclone in the fluidized-bed reactor in a smelting reduction process using fine ore.

2. Background Art

The iron and steel industry is a core industry that supplies the basic materials needed in construction and in the manufacture of automobiles, ships, home appliances, and many of the other products we use. It is also an industry with one of the longest histories that has progressed together with humanity. In an iron foundry, which plays a pivotal roll in the iron and steel industry, after molten iron, which is pig iron in a molten state, is produced by using iron ore and coal as raw materials, steel is produced from the molten iron and then supplied to customers.

At present, approximately 60% of the world's iron production is realized by using the blast furnace process developed from the 14th century. In the blast furnace process, cokes produced by using bituminous coal and iron ore that have undergone a sintering process are charged into a blast furnace, and hot gas is supplied to the blast furnace to reduce the iron ore to iron, to thereby manufacture molten iron.

The blast furnace process for manufacturing molten iron requires materials that have the rigidity beyond a certain level and that can secure breathability in a blast furnace. Therefore, the carbon materials used for fuel and plasticizes lean against the coke, which produces specific fuel coke. Sintered ores, which passed a serial process, are mainly used as iron sources.

Accordingly, in the modern blast furnace method, it is necessary to include raw material pre-processing equipment such as coke manufacturing equipment and sintering equipment to process iron ore, and not only is it necessary to obtain accessory equipment in addition to the blast furnace, but equipment to prevent and minimize the generation of pollution in the accessory equipments are needed. The amount of investment, therefore, is considerable and ultimately increasing manufacturing costs.

In order to solve these problems of the blast furnace method, much research is being conducted into a smelting reduction process for manufacturing molten irons in many countries by directly using raw coal as a fuel and a reducing agent, and also directly using fine iron ore that makes up 80% or more of output ore in the world as an iron source.

Two steps of a reducing method including preliminary reduction and final reduction of ore are generally used in the smelting reduction process. The conventional smelting reduction apparatus consist of a fluidized-bed reduction reactor that forms a bubble fluidized-bed and a melter-gasifier connected the bubble fluidized-bed that forms a coal packed-bed. The fine iron ore at room temperature and additives are charged in to the melter-gasifier and are pre-reduced.

Since hot reducing gas is supplied to the fluidized-bed reduction reactor from the melter-gasifier, the fine iron ore in a room temperature and additives contact the hot reducing gas, and then their temperatures are raised. Simultaneously, fine iron ore at room temperature and additives are reduced with at a ratio of equal to or more than 90% and is plasticized with a ratio equal to or more than 30% and then charged into the melter-gasifier.

Meanwhile, a plurality of cyclones collect ore in the fluidized-bed reduction reactor as fine iron ore particles, drop them by gravity, and recirculate it the fluidized-bed.

A high density flow of the fine iron ore is formed in the cyclone. At this time, operating temperature of the fluidized-bed reduction is equal to or more than 700 degrees, and fine iron ore continuously contacts the reducing gas. In this condition, adhesiveness of the surface of fine iron ore, that is, a state of physical adhesion between fine iron ore particles, becomes high.

Therefore, fine iron ore particles are adhered to each other in the cyclone and such adhesion is promoted more and more since the cyclone is continuously vibrated by the reducing gas flow in operation of the fluidized-bed reduction reactor.

If a size of the fine iron ore particles become equal to or more than a predetermined size, the cyclone is blocked with the adhesive materials, and thereby the flow of fine iron ore is interrupted. As described above, if the flow is interrupted in the cyclone, a large loss of fine iron ore occurs, since the fine iron ore cannot be recovered Moreover, since considerable working hours are necessary to remove the adhesive materials formed in the cyclone, the blockage phenomenon of the cyclone due to the adhesive materials largely reduces an operating ratio of the fluidized-bed reduction reactor.

In order to solve the above problems, the present invention is contrived to provide an apparatus for manufacturing molten iron that prevent agglomeration of fine iron ore particles in a cyclone from forming during fluidizing a fine iron ore reduction process.

SUMMARY OF THE INVENTION

An apparatus for manufacturing molten iron according to an embodiment of the present invention includes: i) at least one fluidized-bed reduction reactor that reduces and plasticizes iron ore and converts the iron ore into reduced material; a melter-gasifier into which the reduced material ore is charged and oxygen is injected, ii) the melter-gasifier manufacturing molten iron; and iii) a reducing gas supply line that supplies a reducing gas discharged from the melter-gasifier to the fluidized-bed reduction reactor, wherein the fluidized-bed reduction reactor includes a cyclone that is installed in the fluidized-bed reduction reactor to collect fine iron ore, and a gas injector that prevents the fine ore from adhering by injecting gas containing carbon and that is connected to the cyclone.

The gas injector may be connected to the fluidized-bed reduction reactor in upper and lower directions of the fluidized bed reduction reactor.

The gas injector may be connected to an upper portion of the fluidized-bed reduction reactor The apparatus for manufacturing molten iron further may include i) an off-gas duct that is arranged above the cyclone and discharges gas and ii) a flange that connects cyclone to the cyclone off-gas duct wherein the gas injector includes a gas injection line that pierces through the flange and is connected to an inner portion of the cyclone.

The gas injection line may cover the cyclone with a spiral shape. A portion of the gas injection line may cover the cyclone with a spring shape.

Meanwhile, the fluidized-bed reduction reactor may further include an inactive gas supply device that is connected to the gas injection line and supplies inactive gas in to the cyclone.

The inactive gas supply device may include i) an inactive gas supply line that is connected to the gas injection line and ii) an automatic valve that periodically opens and closes the inactive gas supply line.

At this time, the inactive gas may be nitrogen.

Meanwhile, the cyclone may include i) a cone portion that collects the fine iron ore, and ii) a dipleg portion that is connected to a lower end of the cone portion and discharges the collected fine iron ore, wherein a plurality of the gas injectors may be connected to the dipleg portion.

In addition, the gas injector may include i) a first gas injector that is connected to a connecting point located between the cone portion and the dipleg portion, ii) a second gas injector that is connected to a lower end of the dipleg portion, and iii) two or less of third gas injectors that are spaced apart from each other by a predetermined distance to be located between the first and the second gas injectors.

The gas containing carbon may include methane.

In addition, a flow velocity of the gas at a portion at which the gas injector and the cyclone are connected to each other may be in a range of 4 m/s to 8 m/s.

Meanwhile, the gas injector may be installed in a fluidized-bed reduction reactor that is directly connected to the melter-gasifier of the fluidized-bed reduction reactors.

In an apparatus for manufacturing molten irons according to the present invention, loss of fine iron ore may be prevented by suppressing adhesion of the fine iron ore in a cyclone of a fluidized-bed reduction reactor in the fluidizing reduction process using fine iron ore.

In addition, an operating rate of the fluidized-bed reduction reactor may be improved since formation of the adhesive materials can be prevented and time for removing them is not consumed.

DETAILED DESCRIPTION OF THE INVENTION

Preferable embodiments of the present invention will be described in order for those skilled in the art to be able to implement it with reference to the attached drawings. The embodiments are merely to illustrate the present invention and the present invention is not limited thereto.

Figure 1:
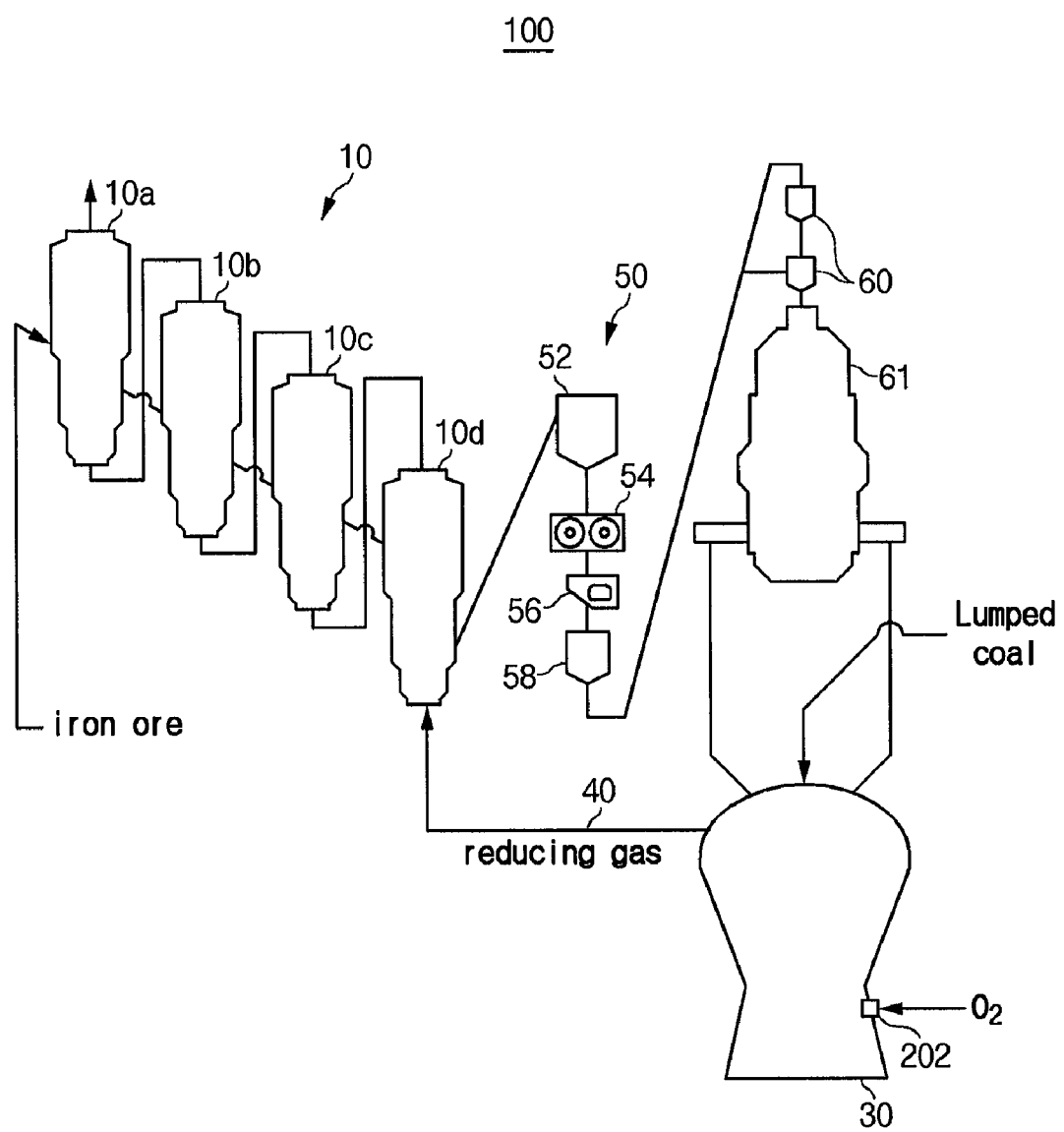
FIG. 1 is a schematic view of an apparatus for manufacturing molten iron according to an embodiment of the present invention.

FIG. 1 is a schematic view of an apparatus for manufacturing molten irons 100 according to an embodiment of the present invention. A configuration of the apparatus for manufacturing molten iron 100 illustrated in FIG. 1 is merely to illustrate the present invention and the present invention is not limited thereto. Therefore, it can be modified in other forms and can further include other devices.

As shown in FIG. 1, the apparatus for manufacturing molten iron 100 mainly includes a fluidized-bed reduction reactor 10, a melter-gasifier 30, and a reducing gas supply line 40.

In addition, the apparatus for manufacturing molten iron 100 may further include an apparatus for manufacturing compacted iron 50 connected between the fluidized-bed reduction reactor 10 and a melter-gasifier 30 and hot pressure equalizing device 60. In addition, the apparatus for manufacturing molten iron 100 can include various devices required for manufacture of molten iron.

The fluidized-bed reduction reactors 10 into which a fluidized-bed is formed are sequentially connected to each other to reduce the fine iron ores in the fluidized-bed and convert them into reduced materials. Each of the fluidized-bed reduction reactors 10 receives the reducing gas discharged from the coal packed-bed of a melter-gasifier 30 through the reducing gas supply line 40.

The fluidized-bed reduction reactor 10 converts the fine iron ore and additives into the reduced materials by passing the reducing gas and flowing therein.

Meanwhile, a plurality of fluidized-bed reduction reactors 10 can be provided with a preheating reduction reactor 10a, a first pre-reduction reactor 10b, a second preheating reduction reactor 10c, and a final reduction reactor 10d, for example, as illustrated in FIG. 1.

The apparatus for manufacturing compacted iron 50 compacts the reduced materials to secure ventilation in the melter-gasifier 30. The apparatus for manufacturing compacted iron 50 includes a charging hopper 52, a pair of rolls 54, a crusher 56, and a reduced materials storage bin 58. In addition, the apparatus for manufacturing compacted iron 50 can include various devices as necessary.

The charging hopper 52 stores reduced materials that are reduced from a mixture containing iron. A pair of rollers 54 press the reduced materials and manufacture compacted reduced materials. The crusher 56 crushes the compacted reduced materials into a suitable size. The reduced materials storage bin 58 temporarily restores crushed reduced materials.

The hot pressure equalizing device 60 is located between the apparatus for manufacturing compacted iron 50 and the melter-gasifier 30. The hot pressure equalizing device 60 is installed above the melter-gasifier 30 to control the pressure. Since the inside of the melter-gasifier 30 is highly pressurized, the hot pressure equalizing device 60 uniformly controls the pressure and allows the crushed reduced materials to be easily charged into the melter-gasifier 30. The reduced materials storage bin 61 can temporarily store reduced materials.

Lumped coals or briquettes made by compressing fine coal are supplied to the melter-gasifier 30, and thereby a coal packed-bed is formed. The lumped coal or coal briquettes supplied to the melter-gasifier 30 is gasified by a heat decomposition reaction in an upper portion of the coal packed-bed and a combustion reaction by the oxygen, which is injected through a tuyere 202 in a lower portion of the coal packed-bed. The hot temperature reducing gas generated in the melter-gasifier 30 is sequentially supplied to the fluidized-bed reduction reactor 10 through the reducing gas supply line 40 connected to a back end of the final reducing reactor 10d and is used as a reducing agent and a fluidizing gas.

Figure 2:
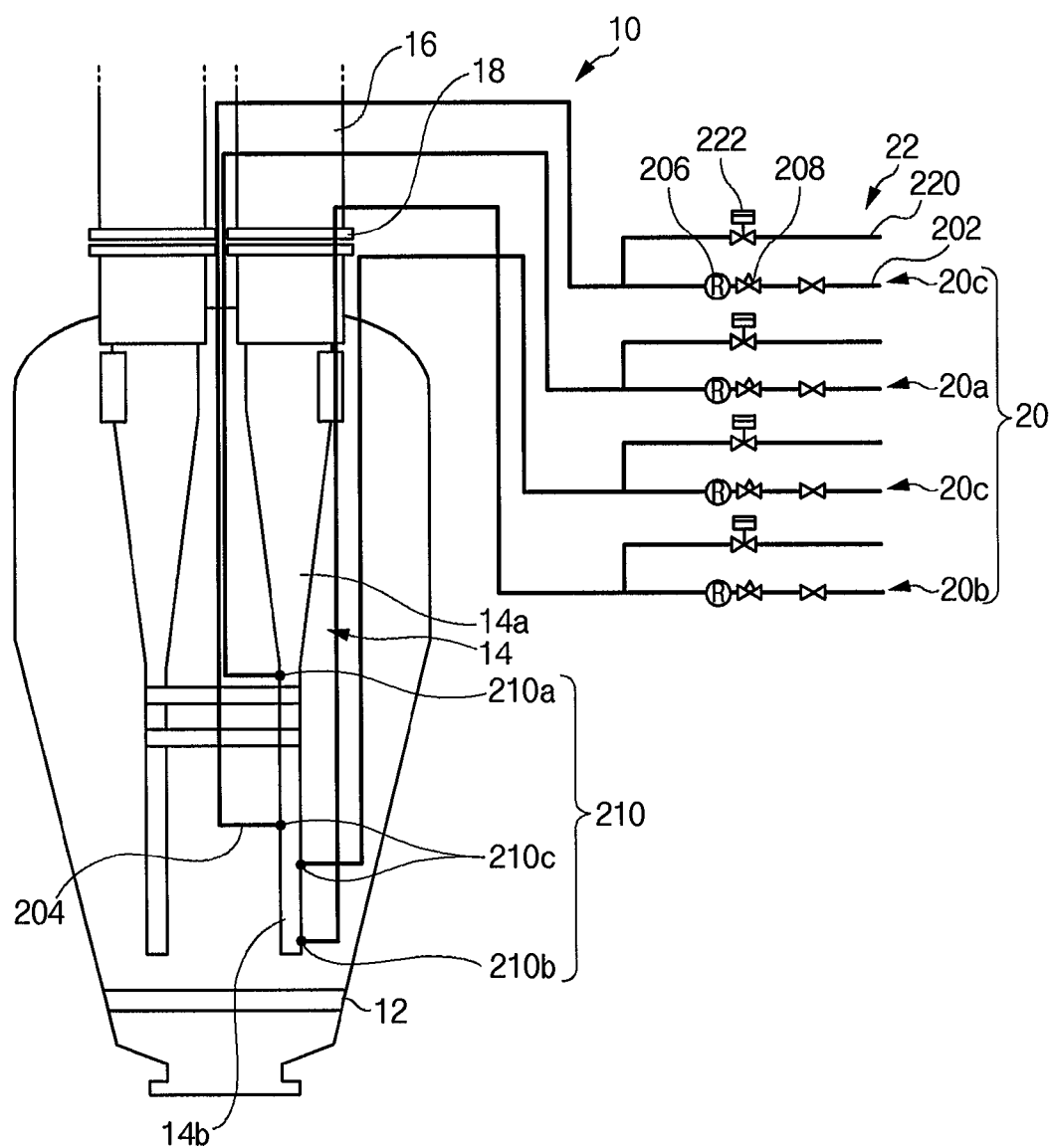
FIG. 2 is a schematic view of the fluidized-bed reduction reactor and the gas injector provided in the apparatus for manufacturing molten iron of FIG. 1.

The fluidized-bed reduction reactor 10 of an apparatus for manufacturing molten iron 100 according to an embodiment of the present invention will be explained in detail below. FIG. 2 is schematic view of the fluidized-bed reduction reactor 10 and the gas injector 20.

As illustrated in FIG. 2, a distributor plate 12 is arranged in a lower portion of fluidized-bed reduction reactor 10 to distribute the reducing gas entering from the lower portion thereof into an upper portion thereof, thereby forming a uniform flow of gas and fine iron ore therein.

Moreover, the fluidized-bed reduction reactor 10 is provided with the cyclone 14 that collects fine iron ore particles therein.

Although two cyclones 14 are illustrated in FIG. 2, this is merely to illustrate the present invention, and the present invention is not limited thereto. Therefore, the number of cyclone 14 can be varied.

An upper portion of the cyclone 14 is formed as a funnel-shaped cone portion 14a and a lower portion thereof is connected to the cone portion 14a and is formed as a tube-shaped dipleg portion 14b having a predetermined diameter. The high-density flow of the fine iron ore is formed in the dipleg portion 14b of the fluidized-bed reduction reactor 10.

Moreover, an off-gas duct 16 discharging a gas of the cyclone 14 and a flange 18 connecting the cyclone 14 to the off-gas duct 16 are provided in the upper portion of the fluidized-bed reduction reactor 10.

In addition, since hot reducing gas discharged from the melter-gasifier 30 is supplied to the final reduction reactor 10d (see FIG. 1) directly connected to the melter-gasifier 30 of the at least one fluidized-bed reduction reactor 10, and a temperature therein is equal to or more than 700° C., there is a great possibility that the adhesive phenomenon between fine iron ore particles can become serious. Therefore, it is necessary to prevent the fine iron ore particles from adhering to each other by installing the gas injector 20 and supplying the carbon gas to the cyclone 14.

The gas injector 20 includes a gas supply line 202 and a gas injection line 204. A flux meter 206 and a flux regulating valve 208 are installed in the gas supply line 202. The amount of carbon gas can be measured by the flux meter 206, and the amount of the carbon gas supplied in the cyclone 14 can be controlled by the flux regulating valve 208.

At this time, fixed carbon can be generated from the carbon gas by heat decomposition at 700 degrees, which is the operating temperature of the final reduction reactor, and since a gas with a decomposing reaction that is endothermic reaction that is desirable, the gas contains at least a predetermined amount of methane, for example, about 50%. For example, liquid natural gas (LNG) can be used as the carbon gas.

The methane is injected into the cyclone 14 to be decomposed by the following reactions in the fine iron ore flow.

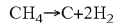

$$CH_4 \rightarrow C + 2H_2 \qquad \text{[Chemical Formula 1]}$$

Carbon particles generated by the above decomposition reaction are precipitated on the surface of the fine iron ore particles in the dipleg portion 14b of the cyclone 14. Therefore, adhesion between fine iron ore particles is prevented.

Moreover, the decomposition reaction of Chemical Formula 1 is an endothermic reaction in which heat of 90,403 Kcal per 1 mole methane is absorbed. A temperature near a position where the carbon gas is injected by the decomposition reaction stat and then adhesion between fin iron ore particles is further prevented.

As shown in FIG. 2, the gas injection line 204 may be connected to the fluidized-bed reduction reactor 10 in upper and lower directions thereof. Considering that a fluidized-bed reduction reactor 10 is maintained at high temperature and have a shape extended along the upper and lower directions, heat expansion and heat contraction mainly occur along the upper and lower directions thereof. Therefore, if the gas injection line 204 is connected along the side direction, the gas injection line 204 is broken by the heat expansion and the heat contraction of the fluidized-bed reduction reactor 10. The gas injection line 204 is connected along the upper and lower directions to prevent the above phenomenon. In particular, it is simple in design to connect the gas injection line 204 to the upper portion of the fluidized-bed reduction reactor 10.

On the other hand, if a velocity of the carbon gas is less than 4 m/s at a connecting point 210 of the dipleg portion 14b and the gas injection line 204, there is a risk that the connecting point of the gas injection line 204 may be blocked due to a back flow of the fine iron ore into the gas injection line 204. If the velocity is 8 m/s or more, there is a risk that the flow of the fine iron ore may be disturbed by the propulsive force of the gas injected at the connecting portion 210 of the gas injection line 204.

Therefore, the flow of the carbon gas injected into the dipleg portion 14b of the cyclone 14 is controlled to be from 4 m/s to 8 m/s at the connecting point 210 of the dipleg portion 14b and the gas injection line 204.

Meanwhile, an inactive gas supply device 22 is connected to the cyclone 14 and installed in the gas supply line 202 of the gas injector 20 to supply an inactive gas therein.

The inactive gas supply device 22 include an inactive gas supply line 22 that is connected to the gas injection pipe 202 and an automatic valve 222 the inactive gas supply line that periodically opens and closes the inactive gas supply line 22. The inactive gas can be, for example, nitrogen.

With the above configuration, the inactive gas can also be periodically supplied to the cyclone 14 through the inactive gas supply line 202 and the gas injection line 204. Therefore, the gas injection line 204 is prevented from being blocked by supplying the inactive gas. That is, carbon gas is decomposed while passing through the gas injection line 204, and the carbon is pushed out of the gas injection line 204 by the inactive gas, thereby discharging it to the cyclone 14. Therefore, the gas injection line 204 is prevented from being blocked.

A plurality of the gas injectors 20 with the above configuration can be provided in each cyclone 14. It is preferable that the gas injector 20 is installed where a flow of the fine iron ore is stagnated, that is, at a connecting point where a portion 14a and a dipleg portion 14b of the cyclone 14 are connected and at an end of the dipleg portion 14b. Flow of the fine iron ore begins at the connecting point thereof.

Thus, the gas injector 20 can include a first gas injector 20a and a second gas injector 20b. In the first gas injector 20a, the connecting point 210a is formed at a location where the cone portion 14a of the cyclone 14 and the dipleg portion 14b are connected. In the second gas injector 20b, the connection portion 210b is formed in the end of the dipleg portion 14b.

Moreover, the dipleg portion 14b can include more connecting portions 210c of the gas injector 20 at predetermined intervals. However, if a gas is injected into too many points of the cyclone 14, it can otherwise disturb the flow of the fine iron ore. Therefore, two or less of the third gas injector 20c that are arranged between the connection portions 210a and 210b of the first gas injector 20a and the second gas injector 20b can be further installed.

Although a configuration of the apparatus for manufacturing molten irons provided with four gas injectors 20 is illustrated in FIG. 2, the present invention is not limited thereto.

Figure 3:
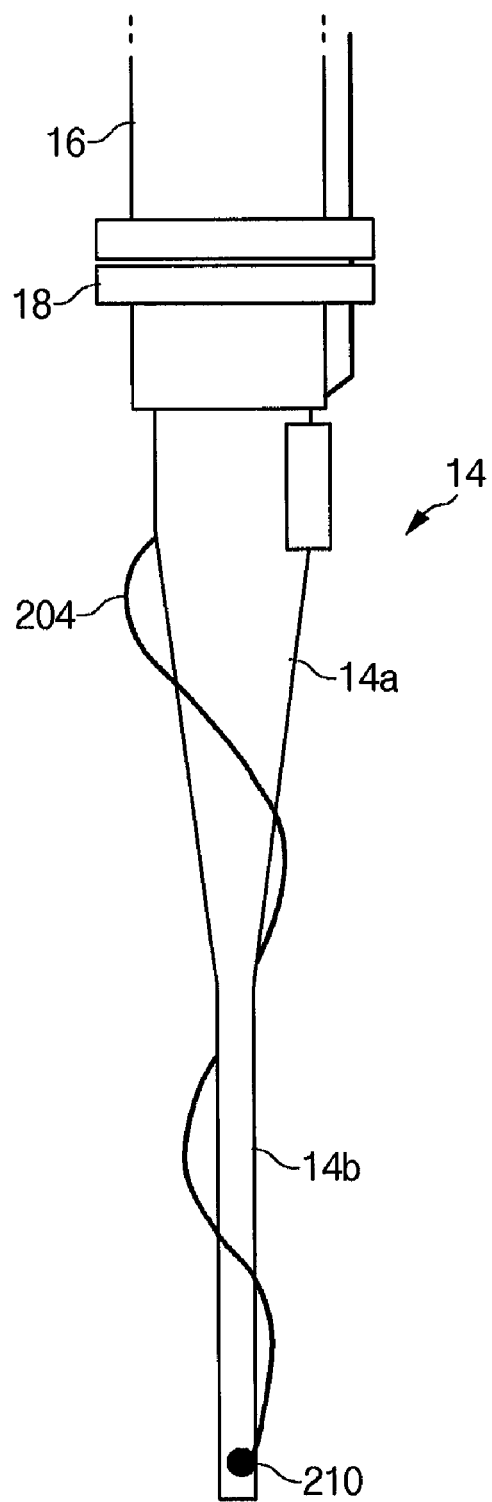
FIG. 3 is a schematic view of the cyclone and the gas injector line provided in the fluidized-bed reduction reactor of FIG. 2.
Figure 4:
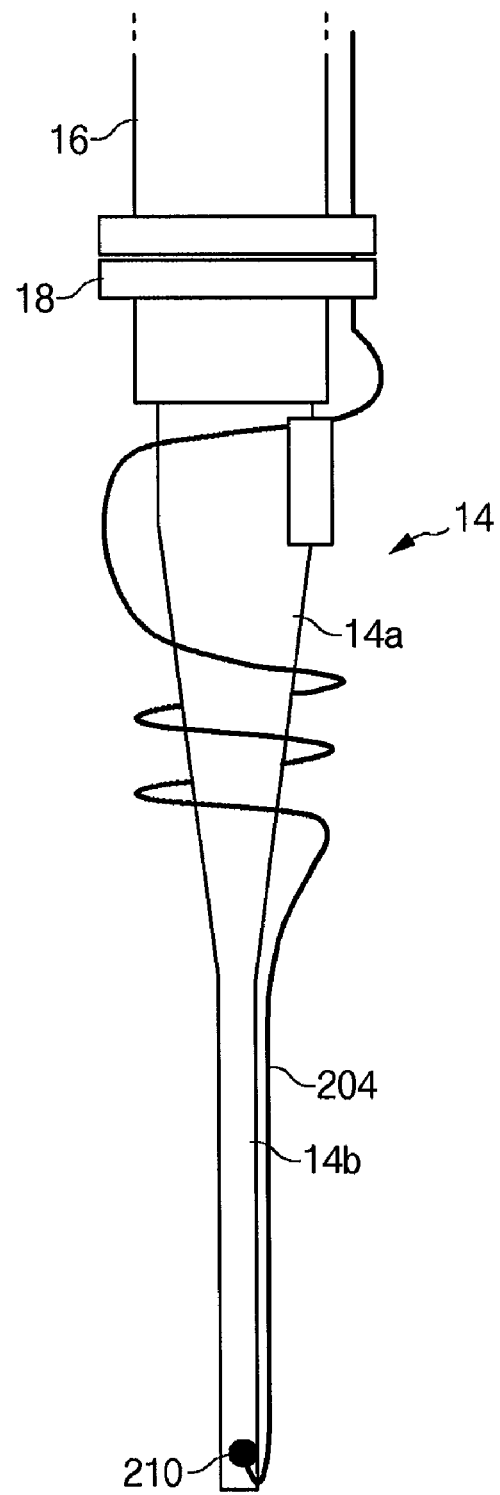
FIG. 4 is a schematic view of the cyclone and other type of gas injection line provided in the fluidized-bed reduction reactor of FIG. 2.

The configuration of the gas injection line 204 is explained in detail below. FIG. 3 is a schematic view of the cyclone 14 and the gas injection line 204 with a spiral form installed around the cyclone 14. FIG. 4 is a schematic view of a configuration of a part of the gas injection line 204 with a spring form as another example of the gas injection line 204.

As shown in FIGS. 3 and 4, the gas injection line 204 is formed in the fluidized-bed reduction reactor while piercing through the flange 18. The gas injection line 204 is connected to the dipleg portion 14b of the cyclone 14.

The gas injection line 204 can be formed to have a spiral shape or a spring shape to cover a surface of the cyclone. In particular, as shown in FIG. 4, if the length of the gas injection line 204 is long, a part thereof can be formed with a spring shape. Therefore, even if the gas injection line 204 is long, it can be flexibly installed and it can endure heat expansion well.

The cyclone 14 is expanded or contracted by rising temperature and cooling in the fluidized-bed reduction reactor, and then shearing stress is applied to a connecting point 210 between the gas injection line 204 and dipleg portion 14b of the cyclone 14. However, as shown in FIG. 3, since the gas injection line 204 is shaped as a coil or a spring, the shear stress applied to connecting point is absorbed thereto and the connecting point 210 is prevented from being broken.

Moreover, the gas injection line 204 with the above configuration can also absorb a vibration of the cyclone 14 caused by the reducing gas flow formed in the fluidized-bed reduction reactor.

On the other hand, the connecting point 210 between the gas injection line 204 and the dipleg portion 14b of the cyclone 14 is welded. Therefore, carbon gas injected from the gas injection line 204 is prevented from leaking outside of the cyclone 14.

The present invention will be described hereinafter with reference to experimental examples. The experimental examples are merely to illustrate the present invention, and the present invention is not limited thereto.

EXPERIMENTAL EXAMPLES

The fine iron ore, which has contacted the gas containing a reducing gas stat a predetermined time was set on a panel, and the panel was gradually rotated in a clockwise direction from 0 degrees. At this time, the angle at which the fine iron ore collapsed was measured. Moreover, many experiments were carried out by varying the gas temperature. Here, the collapse angle is an angle at which the fine iron ore begins to break away from the panel due to gravity. The time at which an adhesion phenomenon occurs and the fine iron ore does not break away from the panel, indicated as 180 degrees.

Experimental Example 1

The collapsing angle of the fine iron ore that contacted a mixed gas containing a reducing gas and a gas containing methane at 50% for a predetermined time was measured.

Experimental Example 2

The collapsing angle of the fine iron ore that contacted a mixed gas containing a stat gas containing methane 100% for a predetermined time was measured.

Comparative Example

As a comparative example for comparing with the experimental examples, the collapsing angle of the fine iron ore that contacted only reducing gas for a predetermined time was measured.

Figure 5:
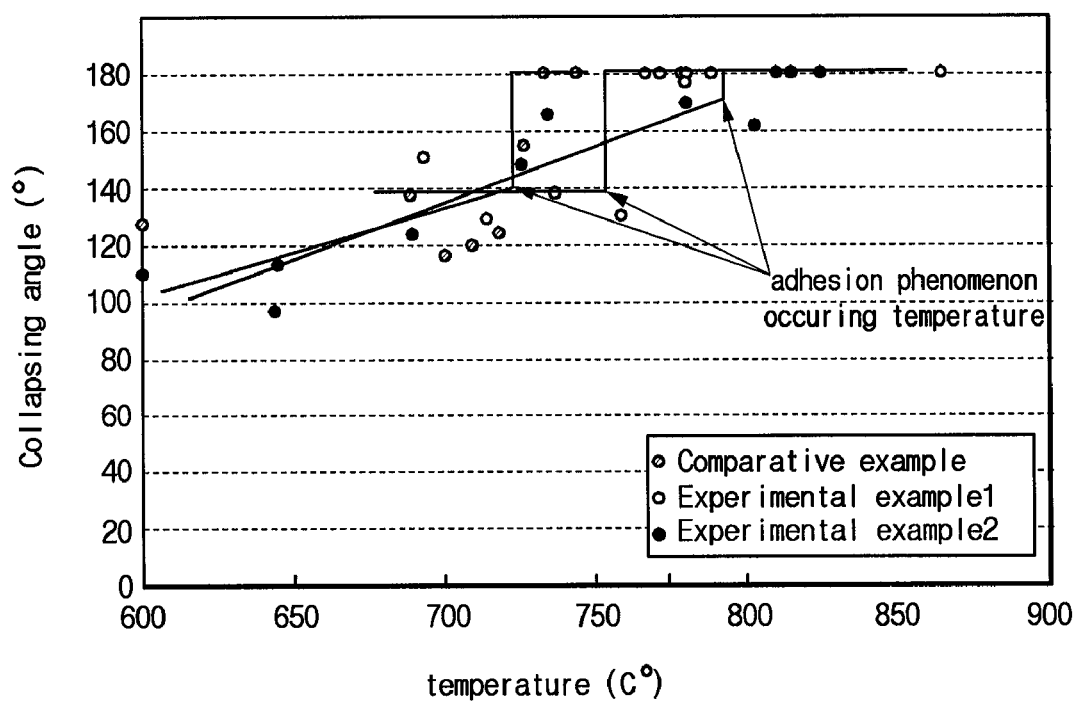
FIG. 5 is graph showing a temperature in which fine ores are adhered in the cyclone.

FIG. 5 is graph showing the experimental results of the experimental examples and the comparative example. As shown in FIG. 5, an adhesion temperature of the fine iron ore that contacted the reducing gas and a gas containing methane at 50% in Experimental Example 1 was 760° C. In addition, an adhesion temperature of the fine iron ore that contacted the reducing gas and a gas containing methane at 100% in Experimental Example 2 was 800° C. Moreover, an adhesion temperature of the fine iron ore that contacted only the reducing gas was 725° C.

As described above, the adhesion temperatures of the Experimental Examples 1 and 2 were 35° C. and 75° C. higher than that of the comparative example, respectively. That is, according to the result of the above experiment, the adhesion phenomenon previously occurs in the comparative example as the gas temperature is gradually raised. The adhesion phenomenon occurs in the experimental examples at a temperature which is higher than that of the comparative example. That is, the adhesion phenomenon in Experimental Examples 1 and 2 are not as serious as that of the comparative example.

This means that adhesion between fine iron ore particles became difficult as a carbon, which is formed from decomposed methane, was precipitated on the surface of the fine iron ore. Therefore, according to the present invention, the adhesion phenomenon between the fine iron ore particles is remarkably reduced at a temperature equal or more than 700° C. which is an operating temperature of the fluidized-bed reduction reactor, particularly the final reduction reactor.

Although exemplary embodiments of the present invention have been described in detail hereinabove, it should be clearly understood that many variations and/or modifications of the basic inventive concept taught herein still fall within the spirit and scope of the present invention, as defined by the appended claims and their equivalents.

What is claimed is:

1. An apparatus for manufacturing molten irons, the apparatus comprising:
   at least one fluidized-bed reduction reactor that reduces and plasticizes iron ore and converts the iron ore into reduced materials;
   a melter-gasifier into which the reduced ore is charged and oxygen is injected, the melter-gasifier manufacturing molten iron; and
   a reducing gas supply line that supplies a reducing gas discharged from the melter-gasifier to the fluidized-bed reduction reactor,
   wherein the fluidized-bed reduction reactor comprises a cyclone that is installed in the fluidized-bed reduction reactor to collect fine iron ore, the cyclone comprising a cone portion that collects the fine iron ore and a dipleg portion that is connected to a lower end of the cone portion and discharges the collected fine iron ore, and
   wherein at least one gas injector, which prevents the fine ore from adhering by injecting gas containing carbon, is connected to the dipleg portion of the cyclone.

2. The apparatus of claim 1, wherein the gas injector is connected to the fluidized-bed reduction reactor in upper and lower directions of the fluidized bed reduction reactor.

3. The apparatus of claim 1, further comprising:
   an off-gas duct that is arranged above the cyclone and that discharges gas; and
   a flange that connects the cyclone to the cyclone off-gas duct,
   wherein the gas injector comprises a gas injection line that pierces through the flange and is connected to an inner portion of the cyclone.

4. The apparatus of claim 3, wherein the gas injection line covers the cyclone with a spiral shape.

5. The apparatus of claim 4, wherein a portion of the gas injection line covers the cyclone with a spring shape.

6. The apparatus of claim 1, wherein the fluidized-bed reduction reactor further comprises an inactive gas supply device that is connected to the gas injection line and supplies an inactive gas to the cyclone.

7. The apparatus of claim 6, wherein the inactive gas supply device comprises:
an inactive gas supply line that is connected to the gas injection line and
an automatic valve that periodically opens and closes the inactive gas supply line.

8. The apparatus of claim 6, wherein the inactive gas is nitrogen.

9. The apparatus of claim 1, wherein the gas injector comprises a first gas injector that is connected to a connecting point located between the cone portion and the dipleg portion.

10. The apparatus of claim 1, wherein the gas injector comprises a second gas injector that is connected to a lower end of the dipleg portion.

11. The apparatus of claim 1, wherein the gas injector comprises two or less of the second gas injectors that are spaced apart from each other by a predetermined distance to be located between a connecting point of the cone portion and the dipleg portion, and the lower end of the dipleg portion.

12. The apparatus of claim 1, wherein the gas containing carbon comprises methane.

13. The apparatus of claim 1, wherein a flow velocity of the gas at a portion at which the gas injector and the cyclone are connected to each other is in a range from 4 m/s to 8 m/s.

14. The apparatus of claim 1, wherein the gas injector is installed in a fluidized-bed reduction reactor that is directly connected to the melter-gasifier of the fluidized-bed reduction reactors.

* * * * *